United States Patent Office 3,484,463
Patented Dec. 16, 1969

3,484,463
3-OXYGENATED PREGNADIEN-21-ALS, 19-NOR DERIVATIVES CORRESPONDING AND ENOL ESTERS THEREOF
Walter R. Benn, Deerfield, Ill., assignor to G. D. Searle & Co., Chicago, Ill., a corporation of Delaware
No Drawing. Filed Sept. 8, 1967, Ser. No. 666,481
Int. Cl. C07c *169/36, 169/34;* A61k *17/06*
U.S. Cl. 260—397.3                                   8 Claims

ABSTRACT OF THE DISCLOSURE 3-oxygenated pregnadien-21-als, 19-nor derivatives corresponding and enol esters thereof useful as progestational, anti-inflammatory, hypocholesterolemic, pepsin-inhibitory and anti-algal agents and preparable by the silver ion catalyzed rearrangement of the corresponding 3-oxygenated 17α-ethynyl-17β-ol esters and hydrolysis of the resulting enol esters to yield the instant 21-als.

---

The present invention relates to polyunsaturated steroidal aldehydes and the enol esters thereof and, more particularly, to 3-oxygenated pregnadien-21-als, the 19-nor derivatives corresponding and the enol esters thereof as represented by the following structural formula

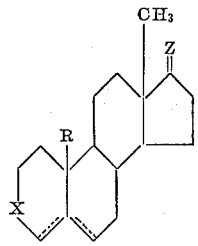

wherein R can be hydrogen or a methyl radical, X is a carbonyl or β-(lower alkanoyl)oxymethylene group, Z is

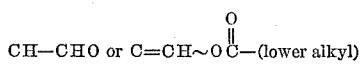

substituent, the wavy line indicating the alternative α and β stereo-chemical configurations, and the dotted line denotes the alternative 4,5- and 5,6 double bonds.

The lower alkyl radicals contemplated in that structural representation are exemplified by methyl, ethyl, propyl, butyl, pentyl, hexyl, heptyl and the branched-chain isomers thereof.

The lower alkanoyl radicals denoted therein are those within the scope of the following formula

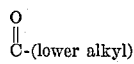

wherein the lower alkyl radicals are as hereinbefore defined.

Suitable starting materials for the manufacture of the compounds of this invention are those represented by the following structural formula

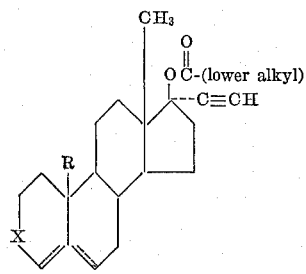

wherein R, X and the dotted lines have the identical meanings as disclosed hereinbefore. Rearrangement of those starting materials to afford the instant enol esters is effected by heating with a suitable silver salt, preferably in an inert organic solvent medium. Silver salts suitable for this purpose are, for example, silver perchlorate, silver tetrafluoroborate and silver trifluoroacetate. Especially preferred organic solvents are those capable of solubilizing both the steroid starting material and the silver salt. Acetone, diethyl ketone, chlorobenzene, ethylene chloride, chloroform and carbon tetrachloride are representative examples.

The presence of a soluble organic base such as tetramethylguanidine or pyridine provides the advantage of inhibiting the hydrolysis of the enol ester to the corresponding aldehyde. That process is specifically illustrated by the reaction of 17β-acetaxy-17α-ethynylestr-4-en-3-one with silver perchlorate in acetone containing tetramethylguanidine at the reflux temperature, thus producing 21β-acetoxy-19-norpregna-4,17(20),20-trien-3-one.

When an aforementioned starting material is contacted with silver acetate in a mixture of acetic acid and acetic anhydride, the corresponding pregnatrienes containing a 16 rather than a 17(20) double bond are produced. 17β-acetoxy-17α-ethynylestr-4-en-3-one is thus heated at the reflux temperature with a mixture of silver acetate, acetic acid and acetic anhydride to produce 21-acetoxy-19-norpregna-4,16,20-trien-3-one. These enol esters are useful as intermediates to the aldehydes of the present invention. Heating of 21 - acetoxy-19-norpregna-4,16,20-trien-3-one with 80% aqueous acetic acid thus affords trans 3-oxo-19-norpregna-4,17(20)-dien-21-al.

The instant enol esters are obtained as mixtures of the 21α and 21β isomers. Those mixtures are separated by fractional crystallization to afford the individual pure isomers.

Hydrolysis of the instant enol esters to afford the corresponding aldehydes is effected by a variety of reagents, for example aqueous potassium hydroxide, potassium carbonate or sodium bicarbonate in methanol, 80% aqueous acetic acid, aqueous formic acid or aqueous mineral acid such as hydrochloric or sulfuric in a suitable solvent such as tetrahydrofuran or dioxane. Most of these hydrolytic procedures result in production of the aldehydes possessing the more stable $\Delta^{17(20)}$ trans stereochemical configuration. The use of 80% aqueous acetic acid results in a mixture of the cis and trans isomers, which are separable by fractional crystallization. A specific hydrolysis procedure is exemplified by the heating of 21β-acetoxy-19-norpregna-4,17(20),20-trien-3-one with aqueous sodium bicarbonate in methanol to yield trans 3-oxo-19-norpregna-4,17(20-dien-21-al.

The alternative cis and trans aldehydes of the present invention are illustrated by the following partial structural formulas

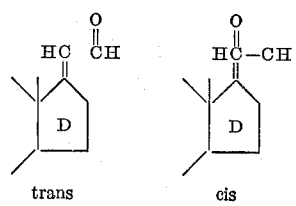

wherein the D ring is illustrated.

When the aforementioned starting materials are contacted with a sulfinyl or sulfenyl halide, there are produced the corresponding sulfinates and sulfenates which, upon heating at elevated temperatures, rearrange to afford the corresponding sulfones and sulfoxides of the following structural formula

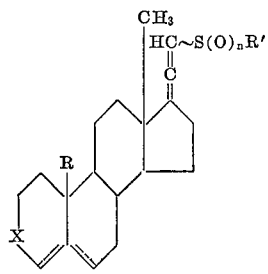

wherein R, X and the dotted line have the same meanings as hereinbefore described, n is a positive integer less than 3 and R' is an aliphatic or aromatic hydrocarbon radical such as methyl, ethyl, phenyl and tolyl. A specific example of these processes is the reaction of 17α-ethynylandrost-5-ene-3β,17β-diol 3-acetate with methanesulfinyl chloride and pyridine in methylene chloride to afford the 17-methanesulfinate, which is heated in chlorobenzene at the reflux temperature of the solution to yield 21β-methanesulfonylpregna-5,17(20),20-trien-3β-ol 3-acetate.

Reaction of the aforementioned starting materials with a disubstituted chlorophosphine results in the initial formation of the corresponding phosphinates which rearrange to yield the disubstituted phosphine oxides represented by the following structural formula

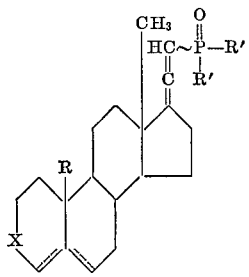

wherein R, R', X and the dotted lines have the same meanings as hereinbefore described. As a specific illustration, 17α-ethynylandrost-5-ene-3β,17β-diol 3-acetate in chloroform is contacted with chlorodiphenylphosphine and pyridine to yield the intermediate 17-phosphinate ester which rearranges to afford 3β-acetoxy-pregna-5,17(20),20-trien-21β-yl diphenylphosphine oxide.

When those starting materials are contacted with a phosphite ester, the corresponding 17-phosphinate ester first formed rearranges to yield the 21-monosubstituted phosphonates of the following structural formula

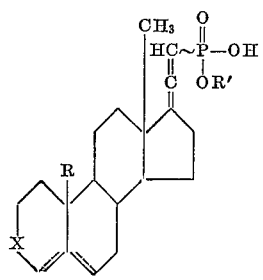

wherein R, R', X and the dotted line have the same meanings as indicated hereinbefore. For example, 17α-ethynylandrost-5-ene-3β,17β-diol 3-acetate is contacted with triethyl phosphite and sodium ethoxide to yield the corresponding 17-phosphinate ester which rearranges upon heating to afford 3β-acetoxypregna-5,17(20),20-trien-21-yl monoethylphosphonate.

The aforementioned phosphorous and sulfur-containing compounds display valuable pharmacological properties. They are, for example, anti-inflammatory agents. They are anti-microbial agents also in consequence of their anti-bacterial, anti-protozoal and anti-algal properties as is evidence by their ability to inhibit the growth of such organisms as *Diplococcus pneumoniae*, *Tetrahymena gelleii* and *Chlorella vulgaris*. In addition, they exhibit pepsin-inhibitory activity.

The compounds of the present invention are also useful in view of their pharmacological activity. They, similarly, possess anti-inflammatory, pepsin-inhibitory and anti-algal properties. In addition, they display progestational and hypocholesterolemic activity. These substances can be administered in any of a number of conventional pharmaceutical forms and also by conventional routes. For oral administration suitable solid forms are pills, powders, capsules, tablets and the like and suitable liquid forms are syrups, emulsions, elixers, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of the present invention is specifically illustrated by the anti-inflammatory activity of pregna-5,17(20),20-triene-3β, 21α-diol 3,21-diacetate when administered subcutaneously to rats at a dose of 25 mg. The following assay was used:

Each of a group of 10 intact male rats weighing 100–130 grams is injected under the plantar surface of each hind foot, with 0.1 ml. of a 1% solution of carrageenin (Type 402, Marine Colloids, Inc.). The test compound, dissolved or suspended in saline, corn oil or propylene glycol, is administered subcutaneously 1 hour prior to the carrageenin injection. Another such group serving as controls is treated in the identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease (P<0.05) in the swelling observed in control animals. In this assay, the aforementioned pregna-5,17(20),20-triene-3β,21α-diol 3,21-diacetate was observed to produce a significant decrease in swelling.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.) and quantities of materials in parts by weight unless otherwise noted.

EXAMPLE 1

A mixture containing 10.6 parts of 17β-acetoxy-17α-ethynylestr-4-en-3-one, 0.365 part of silver perchlorate, 0.4 part of tetramethylguanidine and 120 parts of acetone is heated at the reflux temperature, in a nitrogen atmosphere, for about 72 hours. The resulting solution is then cooled and stirred with 1 part by volume of saturated aqueous ammonium chloride for about 15 minutes. The precipitated silver salts are removed by filtration and the filtrate is concentrated to dryness under reduced pressure, thus affording the gummy solid crude product. Crystallization first from ethyl acetate, then from acetone-pentane containing a trace of pyridine affords pure 21β-acetoxy-19-norpregna-4,17(20),20-trien-3-one, melting at about 187–190°. This compound displays an optical rotation, in chloroform, of +144°, an ultraviolet absorption maximum at about 238.5 millimicrons with a molecular extinction coefficient of about 19,550 and infrared absorption peaks in a potassium bromide disc, at about 3.23, 5.03, 5.69, 5.91, 6.15, 7.91, 8.06 and 9.63 microns.

Nuclear magnetic resonance spectral peaks are observed at about 60.5, 128, 350 and 445 cycles per second. This compound is represented by the following structural formula

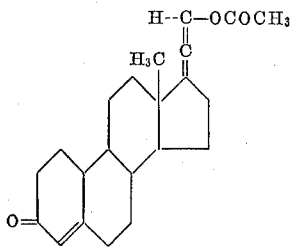

Chromatography on silica gel of the mother liquors obtained from the foregoing crystallization followed by elution with 3% ethyl acetate in benzene affords an additional quantity of the 21β-acetoxy compound. Concentration of the filtrates obtained from the latter crystallization yields 21α-acetoxy-19-norpregna-4,17(20),20-trien-3-one, characterized by nuclear magnetic resonance spectral peaks at 56.5, 128, 350 and 445 cycles per second.

EXAMPLE 2

A mixture containing 1.58 parts of 21β-acetoxy-19-norpregna-4,17(20),20-trien-3-one, 40 parts of methanol and 5 parts by volume of saturated aqueous sodium bicarbonate is heated, under nitrogen, at the reflux temperature for about 30 minutes, then is cooled and diluted with water. The resulting precipitated crude product is collected by filtration and washed on the filter with water. Recrystallization from aqueous acetone results in pure trans 3-oxo-19-norpregna-4,17(20)-dien-21-al, melting at about 142–145°. An ultraviolet absorption maximum is observed at about 242 millimicrons with a molecular extinction coefficient of about 35,500. This compound displays infrared absorption peaks, in a potassium bromide disc, at about 3.59, 5.95, 6.11, 6.15, 7.93, 8.29, 8.78 and 10.35 microns. Nuclear magnetic resonance spectral peaks are displayed at about 56.6, 344, 347 and 589 cycles per second. This compound is represented by the following structural formula

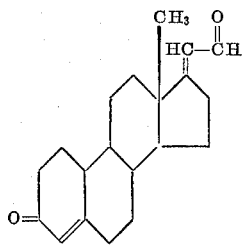

EXAMPLE 3

When a mixture of 21β-acetoxy-19-norpregna-4,17(20),20-trien-3-one and 21α-acetoxy-19-norpregna-4,17(20),20-trien-3-one is hydrolyzed according to the procedure of Example 2, there is produced trans 3-oxo-19-norpregna-4,17(20)-dien-21-al, identical with the product of Example 2.

EXAMPLE 4

To a solution of 8 parts of 17β-acetoxy-17α-ethynylandrost-4-en-3-one in 120 parts of acetone is added 0.2 part of tetramethylguanidine and 0.358 part of silver perchlorate. That reaction mixture is heated at the reflux temperature, under nitrogen, for about 48 hours, then is cooled and stirred with approximately 2 parts by volume of saturated aqueous sodium chloride for about 15 minutes. The resulting precipitated silver salts are removed by filtration and the filtrate is diluted with approximately 210 parts of ether, then washed with saturated aqueous sodium chloride containing a small amount of sodium bicarbonate. The ethereal solution is dried over anhydrous sodium sulfate, then concentrated to dryness to afford a light yellow glass-like residue. That residue is dissolved in benzene and chromatographed on a silica gel column, then eluted with 2–5% ethyl acetate in benzene solutions. The eluted fractions are isolated as a colorless glass by concentration of the eluates to dryness, thus producing 21-acetoxypregna-4,17(20),20-trien-3-one, characterized by infrared absorption maxima, in chloroform, at about 5.05, 5.72, 6.01, 6.20, 8.10, 8.18 and 9.61 microns. Nuclear magnetic resonance maxima are observed at about 55, 59, 73, 127.5, 345.5, 443 and 446 cycles per second.

EXAMPLE 5

A mixture containing 19 parts of 17α-ethynylandrost-5-ene-3β,17β-diol 3,17-diacetate, 0.619 part of silver perchlorate, 0.5 part of tetramethylguanidine and 400 parts of acetone is heated at the reflux temperature, under nitrogen, for about 4 days, then is cooled to room temperature. Approximately 5 parts by volume of saturated aqueous ammonium chloride is added and that mixture is stirred for about 15 minutes. The precipitated solids are removed by filtration and the filtrate is concentrated to approximately ⅔ volume, then allowed to cool slowly. The crystalline crude product is collected by filtration, then purified by recrystallization from acetone to yield pure pregna-5,17(20),20-triene-3β,21α-diol 3,21-diacetate, melting at about 199–202°. It exhibits an optical rotation, in chloroform, of −67.3° and infrared absorption maxima, in a potassium bromide disc, at about 3.25, 5.03, 5.76, 8.05, 8.19, 9.55, 9.71, 10.76, 11.06 and 12.75 microns. Nuclear magnetic resonance peaks are observed at about 53.2, 62.5, 121.2, 126.5, 278, 324 and 439 cycles per second.

Further concentration of the original acetone filtrates results in crystallization of pregna-5,17(20),20-triene-3β,21β-diol 3,21-diacetate. Additional quantities of the material are obtained by chromatography of the filtrates on a silica gel column, followed by elution of the column with 1% ethyl acetate in benzene. That crude product is purified by recrystallization from ether-pentane to yield the pure compound, melting at about 128–131° and displaying an optical rotation, in chloroform, of −11°. Infrared absorption maxima are observed at about 3.29, 5.05, 5.68, 5.77, 8.05, 8.20, 8.80, 9.59, 9.63, 10.98, 11.09 and 12.74 microns and nuclear magnetic resonance peaks are displayed at about 57, 63.2, 121.5, 127.5, 277, 323 and 446 cycles per second. This compound is represented by the following structural formula

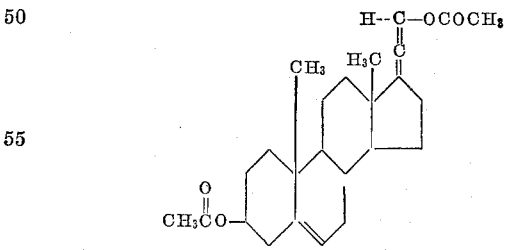

EXAMPLE 6

A mixture containing 4.9 parts of 17β-acetoxy-17α-ethynylestr-4-en-3-one, 100 parts of acetic acid, 50 parts of acetic anhydride and 0.2 part of silver acetate is stirred in a nitrogen atmosphere at the reflux temperature for about 30 minutes, then is cooled and decanted from the precipitated solids. That solution is poured into approximately 2,000 parts of water and allowed to stand for about 1 hour. The resulting suspension is extracted with ether and the ether layer is separated, washed successively with water, saturated aqueous sodium carbonate and saturated aqueous sodium chloride, then dried over anhydrous sodium sulfate and concentrated under reduced pressure to afford a light amber gummy residue. Extraction of that residue into benzene affords a solution, which is chromatographed on a silica gel column. Elution of the column with 10–20% ether in benzene solutions followed by recrystallization of the resulting fractions from aqueous methanol yields rod-like crystals of 21-acetoxy-19-norpregna-4,16,20-trien-3-one, melting at about 122–129°. It exhibits an ultraviolet absorption maximum at about 243 millimicrons with a molecular extinction coefficient of about 33,200 and infrared absorption peaks, in a potassium bromide disc, at about 5.69, 5.96, 6.15, 8.18, 9.15 and 10.45 microns.

EXAMPLE 7

A mixture containing 1 part of 21-acetoxy-19-norpregna-4,16,20-trien-3-one and 20 parts by volume of 80% acetic acid is heated on a steam bath for about 30 minutes, then is diluted with water. The resulting precipitate is extracted into ether and that organic solution is washed with dilute aqueous sodium bicarbonate, then dried over anhydrous magnesium sulfate and stripped of solvent under reduced pressure to afford the crude product. Recrystallization from aqueous acetone yields trans 3-oxo-19-norpregna-4,17(20)-dien-21-al, identical with the product of Example 2.

EXAMPLE 8

When an equivalent quantity of 17α-ethynyl-3-methoxyestra-2,5(10)-dien-17β-ol 17-acetate is substituted in the procedure of Example 6 and the resulting product is hydrolyzed by the procedure of Example 7, there is produced trans 3-oxo-19-norpregna-4,17(20)-dien-21-al, identical with the product of Example 7.

EXAMPLE 9

By subsituting an equivalent quantity of 17α-ethynyl-17β-propionoxyandrost-4-ene-3-one and otherwise proceeding according to the processes described in Example 4, there is produced 21-propionoxypregna-4,17(20),20-trien-3-one.

EXAMPLE 10

When an equivalent quantity of 17α-ethynyl-17β-propionoxyestr-4-en-3-one is substituted in the procedure of Example 1, there are obtained 21β-propionoxy-19-norpregna-4,17(20),20-trien-3-one and 21α - propionoxy - 19-norpregna-4,17(20),20-trien-3-one.

EXAMPLE 11

The substitution of an equivalent quantity of 17α-ethynylandrost-5-ene-3β,17β-diol 3,17-dipropionate in the procedure of Example 5 results in pregna-5,17(10),20-triene-3β,21α-diol 3,21-dipropionate and pregna-5,17(20),20-triene-3β,21β-diol 3,21-dipronpionate.

EXAMPLE 12

When an equivalent quantity of 17α-ethynylestr-5-ene-3β,17β-diol 3,17-dipropionate is substituted in the procedure of Example 5, there are obtained 19-norpregna-5,17(20),20-triene-3β,21α-diol 3,21 - dipropionate and 19-norpregna - 5,17(20),20 - triene - 3β,21β - diol 3,21-dipropionate.

EXAMPLE 13

To a solution of 2 parts of methanesulfinyl chloride in 20.1 parts of methylene chloride, cooled to about −70°, in a nitrogen atmosphere, is added with stirring a solution of 4.5 parts of 17α-ethynylandrost-5-ene-3β,17β-diol 3-acetate in 100 parts of methylene chloride containing 1 part of pyridine. The reaction mixture is allowed to warm to room temperature over a period of about 30 minutes, then is stirred at room temperature for about 2 hours and diluted with approximately 400 parts of methylene chloride. The resulting organic solution is washed successively with water, saturated aqueous sodium bicarbonate, water and saturated aqueous sodium chloride, then dried over anhydrous sodium sulfate and evaporated to dryness under reduced pressure. Trituration of the resulting residue with ether affords, as a white crystalline solid, 17α-ethynyl- androst-5-ene-3β,17β-diol 3-acetate, 17-methanesulfinate, melting at about 165°. This compound exhibits infrared absorption maxima, in chloroform, at about 3.03, 5.78, 7.95, 8.15, 8.50, 8.82 and 9.69 microns. Nuclear magnetic resonance spectral peaks are observed at about 55, 62.5, 122, 160, 172, 275 and 323 cycles per second.

A solution of 5.28 parts of 17α-ethylandrost-5-ene-3β, 17β-diol 3-acetate, 17-methanesulfinate in 166.5 parts of chlorobenzene is heated at the reflux temperature, under nitrogen, for about 3 hours, then is concentrated to dryness under reduced pressure to afford a light brown solid residue. Recrystallization of that material first from ethyl acetate then from acetone affords platelet-like crystals of 21β-methanesulfonylpregna-5,17(20),20-trien - 3β - ol 3-acetate, melting at about 191–194°. It exhibits an optical rotation, in chloroform, of +96°, infrared absorption maxima, in a potassium bromide disc, at about 5.11, 5.78, 7.68, 8.09, 8.81, 9.70 and 12.55. microns and nuclear magnetic resonance maxima at about 63, 122, 179.5, 277, 323 and 374 cycles per second.

EXAMPLE 14

To a cold solution of 11 parts of 17α-ethynylandrost-5-ene-3β-17β-diol 3-acetate in 112 parts of chloroform containing 3 parts of pyridine is added with stirring a solution of 7.57 parts of chlorodiphenylphosphine in 37 parts of chloroform. That reaction mixture is allowed to warm to room temperature, then is stirred at that temperature for about 48 hours. At the end of that time the reaction mixture is diluted with chloroform, then washed successively with dilute hydrochloric acid, water, saturated aqueous sodium carbonate, water and saturated aqueous sodium chloride. Drying over anhydrous sodium sulfate followed by evaporation of the solvent affords a glass-like residue, which is triturated with ether in order to induce crystallization. The resulting crude product is collected by filtration, then purified by recrystallization from acetone to yield pure 3β-acetoxypregna-5,17(20),20-trien-21β-yl diphenylphosphine oxide, melting at about 188–190°. It exhibits an optical rotation of +119.5° in chloroform, infrared absorption maxima, in a potassium bromide disc, at about 5.11, 5.75, 6.94, 7.96, 8.44, 8.93, 9.06 and 9.67 microns and also nuclear magnetic resonance peaks at about 20, 59.5, 122, 277, 323, 346–361 and 443–476 cycles per second.

EXAMPLE 15

To a slurry of 10 parts of 17α-ethynyl-17β-hydroxyandrost-4-en-3-one with 300 parts of chloroform containing 4 parts of pyridine is added slowly with stirring a solution of 10.5 parts of chlorodiphenylphosphine in 75 parts of chloroform. The reaction mixture is stirred at room temperature for about 5 days, then is filtered in order to remove some unreacted starting material. The filtrate is diluted with chloroform, then washed successively with dilute hydrochloric acid, water, saturated aqueous sodium carbonate, water and saturated aqueous sodium chloride. The washed solution is then dried over anhydrous sodium sulfate and evaporated to dryness under reduced pressure. The glass-like residue thus produced is extracted with benzene and the benzene solution is chromatographed on magnesium silicate. Elution with 20–80% ethyl acetate in benzene solutions followed by recrystallization of the eluted fractions from acetone affords pure 3-oxopregna-4, 17(20),20-trien-21β-yl diphenylphosphine oxide, melting at about 195–201° with decomposition and displaying an optical rotation of +316.8° in chloroform. Ultraviolet absorption maxima are observed at about 223.5 and 272 millimicrons with an inflection at about 244 millimicrons, those peaks possessing, respectively, molecular extinction coefficients of about 33,500, 1,930 and 19,900. In a potassium bromide disc, infrared absorption peaks are observed at about 5.12, 5.98, 6.19, 6.96, 8.13, 8.35, 8.94, 9.11, 11.59, 12.78, 13.45 and 14.36 microns. Nuclear magnetic resonance maxima are observed at about 22.5, 69, 344, 347.5–362.5 and 443–477 cycles per second.

EXAMPLE 16

To a solution of 10 parts of 17α-ethynyl-17β-hydroxyestr-4-en-3-one in 150 parts of chloroform containing 4 parts of pyridine, cooled to about 8°, is added with stirring, over a period of about 15 minutes, 11 parts of chlorodiphenylphosphine. The reaction mixture is allowed to come to room temperature, then is stirred for a period of about 44 hours. Dilution with chloroform followed by washing successively with dilute hydrochloric acid, water, saturated aqueous sodium bicarbonate, water and saturated aqueous sodium chloride, drying over anhydrous sodium sulfate and evaporation of the solvent under reduced pressure affords the crude product as an off-white solid. Recrystallization from acetone affords pure 3-oxo-19-norpregna-4,17(20),20-trien-21β-yl diphenylphosphine oxide as two polymorphic forms, one form showing a transition point at about 195° and melting at the melting point of the other form, i.e. about 240° with decomposition. This compound exhibits an optical rotation, in chloroform, of +277.5°, ultraviolet absorption maxima at about 224 and 272 cycles per second with molecular extinction coefficients of 37,200 and 2,030, respectively, and also an inflection at about 240 millimicrons with a molecular extinction coefficient of about 25,000. Both polymorphic forms exhibit identical infrared spectra in chloroform, thus display peaks at about 5.11, 6.00, 6.18, 6.95, 8.49, 8.92 and 9.06 microns. Nuclear magnetic resonance maxima are observed at about 24, 350, 352–362 and 443–478 cycles per second.

EXAMPLE 17

To a slurry of 7.1 parts of 17α-ethynyl-androst-5-ene-3β,17β-diol 3-acetate in 194 parts of triethyl phosphite, in a nitrogen atmosphere, is added with stirring 1.1 parts of sodium ethoxide. The resulting reaction mixture is gradually warmed to effect homogeneity, then is heated at the reflux temperature for about 24 hours. During that heating period a heavy precipitate forms and, after cooling to room temperature, is removed by filtration under nitrogen. Partition of that solid crude product between ether and water affords an aqueous solution, which is concentrated to dryness under nitrogen, thus producing the sodium salt of 3β-acetoxypregna-5,17(20),20-trien-21-yl monoethyl phosphonate, which sinters at about 300°. This sodium salt exhibits infrared absorption peaks, in a potassium bromide disc, at about 5.09, 5.75, 7.96–8.18, 9.25, 9.45, 10.59 and 12.45 microns.

The latter sodium salt is converted to the free acid by passage of a 50% aqueous ethanol solution through a strongly acid cation exchange resin. The acid crystallizes out of the eluate upon cooling, thus affording 3β-acetoxypregna-5,17(20),20-trien-21-yl monoethyl phosphonate as the hemihydrate, melting at about 167°. It exhibits infrared absorption maxima, in a potassium bromide disc, at about 2.90, 5.09, 5.75, 7.91, 8.02, 9.65, 10.05, and 10.43 microns and also nuclear magnetic resonance peaks at about 59, 62.5, 80, 122, 246, 277, 322 and 327 cycles per second.

The 50% aqueous ethanol eluate obtained as described above is heated briefly, then is concentrated to dryness under reduced pressure and the resulting residue is extracted with chloroform. Removal of the chloroform by distillation under reduced pressure affords 3β-hydroxypregna-5,17(20),20-trien-21-yl monoethyl phosphonate as a glass.

A solution of 4.5 parts of the latter 3β-hydroxy compound in 24 parts of ethanol is mixed with 1 part of cyclohexylamine and the resulting precipitated salt is collected by filtration, then purified by recrystallization from ethanol. The resulting cyclohexylamine salt of 3β-hydroxypregna-5,17(20),20-trien-21-yl monoethyl phosphonate melts with decomposition at about 254° and displays infrared absorption maxima, in a potassium bromide disc, at about 3.00, 4.57, 5.10, 8.51, 8.58, 9.20, 9.51, 10.63 and 12.51 microns.

What is claimed is:
1. A compound of the formula

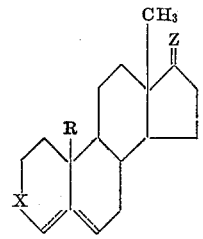

wherein R is selected from the group consisting of hydrogen and a methyl radical, X is a member of the class consisting of carbonyl and β-(lower alkanoyl)-oxymethylene radicals, the dotted lines indicate a 4,5-double bond when X is carbonyl and a 5,6-double bond when X is β-(lower alkanoyl)oxymethylene, Z is a

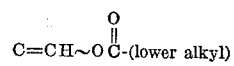

radical when R is a methyl radical and Z is selected from the group consisting of a CH—CHO and a

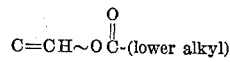

radical when R is hydrogen.

2. As in claim 1, a compound of the formula

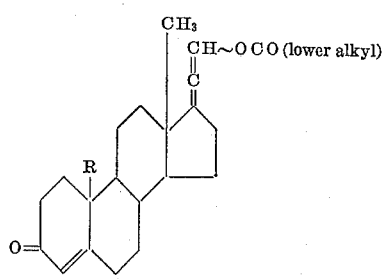

wherein R is selected from the group consisting of hydrogen and a methyl radical.

3. As in claim 1, a compound of the formula

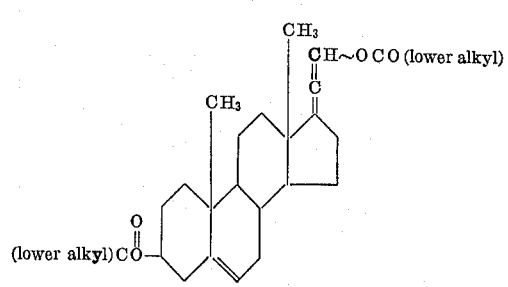

4. As in claim 1, the compound which is trans-3-oxo-19-norpregna-4,17(20)-dien-21-al.
5. As in claim 1, the compound which is pregna-5,17(20),20-triene-3β,21α-diol 3,21-diacetate.
6. As in claim 1, the compound which is pregna-5,17(20),20-triene-3β,21β-diol 3,21-diacetate.
7. As in claim 1, the compound which is 21β-acetoxy-19-norpregna-4,17(20),20-trien-3-one.

8. As in claim 1, the compound which is 21-acetoxy-pregna-4,17(20),20-trien-3-one.

References Cited

UNITED STATES PATENTS 2,272,809  2/1942  Meischer et al. ____ 260—397.4
3,057,888  10/1962  Marbet et al. _____ 260—397.47
3,374,253  3/1968  Fried _____ 260—397.3

LEWIS GOTTS, Primary Examiner
E. G. LOVE, Assistant Examiner

U.S. Cl. X.R.

260—397.47, 397.5; 424—238, 242